United States Patent [19]
Marbler et al.

[11] Patent Number: 5,958,534
[45] Date of Patent: Sep. 28, 1999

[54] PACKAGING MATERIAL

[75] Inventors: Claude A. Marbler, Phalsbourg; René Parmentier, Buhl, both of France

[73] Assignee: Alusuisse Technology & Management Ltd., Neuhausen am Rheinfall, Switzerland

[21] Appl. No.: 08/900,282

[22] Filed: Jul. 25, 1997

[30] Foreign Application Priority Data

Aug. 13, 1996 [CH] Switzerland .............................. 1987/96

[51] Int. Cl.$^6$ .............................. B29D 22/00; B32B 1/08
[52] U.S. Cl. .................. 428/36.6; 428/474.4; 428/476.3; 428/478.8; 428/479.3; 428/479.6; 428/508; 428/511; 428/537.5
[58] Field of Search ..................... 428/511, 508, 428/537.5, 36.6, 474.4, 476.3, 478.8, 479.3, 479.6

[56] References Cited

U.S. PATENT DOCUMENTS 4,977,031 12/1990 Temple ..................................... 428/463

FOREIGN PATENT DOCUMENTS

| 0 299 550 | 7/1987 | European Pat. Off. . |
| 0 441 234 | 8/1991 | European Pat. Off. . |
| 2 338 197 | 8/1977 | France . |
| 2 355 731 | 1/1978 | France . |

*Primary Examiner*—Leszek Kiliman
*Attorney, Agent, or Firm*—Fisher, Christen&Sabol

[57] ABSTRACT

Packaging material for packaging moisture-sensitive products, for example soft cheese which in some cases undergoes a maturing process in the packaging.

The packaging material contains at least two functional layers,
a) a first functional layer (10, 11) which exhibits mechanical strength and can take up, store and release moisture, e.g. coated paper and
b) a second functional layer (12, 13) which lies on the first functional layer and exhibits permeability to gases, the said permeability varying as a function of the moisture, e.g. a plastic laminate comprising an ionomer resin and a polyamide,
the first functional layer and the second functional layer being permanently joined to each other.

8 Claims, 1 Drawing Sheet

PACKAGING MATERIAL

BACKGROUND OF THE INVENTION

1. Field of the Invention

Packaging material for packaging moisture-sensitive products, containing at least two functional layers.

2. Background Art

It is known that foodstuffs such as e.g. cheeses mature during storage, during which process gases, such as $CO_2$, which should escape are produced; the moisture of the surroundings must be under control and the ingress of oxygen may have to be limited. In particular, in the case of soft cheeses which are enclosed in the final form of packaging immediately or shortly after production, the packaging material is very important as the cheese has to mature in the packaging and have to be ready packed for storage, handling and selling.

A packaging material e.g. for cheese, meat etc., known for example from EP-A 0 229 550, comprises a combination of a support and a material that is permeable to moisture. The support may be of paper or a micro-porous polymer or a polymer featuring micro-perforations. The material which is permeable to moisture is e.g. a polymer or copolymer based on acrylnitriles, in particular grafted polymers of amidon-polyacrylnitrile and a polyfunctional alcohol.

Such packaging materials are complicated to manufacture and can be improved upon further e.g. with respect to the materials to be used, properties and economics of manufacture.

BROAD DESCRIPTION OF THE INVENTION

The object of the present invention is to provide an improved material.

That objective is achieved by way of the invention in that
 a) a first functional layer (10, 11) exhibits mechanical strength and can take up, store and release moisture, and
 b) a second functional layer (12, 13), which lies on the first functional layer, exhibits permeability to gases, said permeability varying as a function of the moisture, and
the first functional layer and the second functional layer are permanently joined to each other.

DETAILED DESCRIPTION OF THE INVENTION

The first functional layer on the finished packaging material is, as a rule, facing the contents packaged by the material in question, while the second functional layer represents the outside of the package.

It is useful for the first functional layer to be a paper (10) or a paper (10) bearing a coating (11).

Packaging and enveloping or labelling papers may e.g. be used as paper here. The surfaces of the papers may be machine smooth or smooth on one side and may be satin-finished crimped, coloured on non-coloured. In some cases the paper may contain synthetic fibres. The papers have a weight per unit area e.g. of 10 to 100 g/m$^2$, advantageously 20 to 50 g/m$^2$.

In one useful form the paper exhibits a coating, and is in the form of a paper-plastic laminate material bearing, at least on one side, an extrusion-deposited coating, dispersion layer, paraffin coating, hot-melt coating or an organic coating (German=Lackschicht). In order to improve the bond strength between the paper and the plastic, corona discharging, flame treatment, plasma treatment or ozone treatment may be applied to the paper strip. The extrusion layer may have a weight per unit area of e.g. 1 to 20 g/m$^2$. The coating is in particular deposited directly onto the paper.

The extrusion layer may e.g. be of a polyolefin, such as a polyethylene e.g. having a density of 0.92 to 0.96, in particular 0.92, or a polypropylene, a polyvinyl chloride, an ethylene copolymer, a polyamide or a polyester. The thickness of the layer may be e.g. 10 to 100 μm.

The paraffin or hot-melt coating may contain e.g. paraffins, paraffin-plastic mixtures such as paraffins with copolymers of ethylene-vinylacetate, also balsam resins, colophomium derivatives, hydrocarbon resins, waxes, organic sealing compounds, organic sealing compounds based on polyvinyl-chloride, polyolefins or polyacrlyesters, copolymers of ethylene acrylester or copolymers or mixtures such as paraffins and waxes containing carboxly groups. The paraffin or hot-melt coating may have a weight per unit area of 1 to 20 g/m$^2$.

The organic coating layer may be e.g. an organic coating layer based on polyvinyl-chloride, polyvinyliden-chloride, polyvinyl-acetate or polyacrylacid esters which are deposited from water or solvents, or it may be a solvent-free organic coating such as e.g. liquid mixtures of monomers and oligomers which polymerise or cross-link during drying.

In some cases the cladding may take place by joining the paper strip to a ready-made plastic film.

The coating may exhibit sealing properties and the packaging material may be wholly or partially sealed by means of the coating.

The first functional layer is required, e.g. when used for packaging soft cheeses, to provide sufficient mechanical strength to maintain the structure and shape of the contents e.g. the cheese. The paper is required to take up moisture, to store and release this, and to equilibrate the temperature.

A coating is provided on the paper, at least on one side, and preferably only on one side. The coating lies in particular on the side of the packaging facing the contents. The coating is required, e.g. when the packaging material is used for packaging cheese, to help the mould to form on the cheese and to remain there during storage. This ensures that the outer layer of the mould does not become unattractive i.e. shiny and smooth.

The second functional layer may e.g. be a polyamide or a polyamide along with an ionomer-resin or a polyamide along with an ethylene/vinyl-alcohol copolymer.

The polyamide and the ionomer-resin or the polyamide along with an ethylene/vinyl-alcohol copolymer are preferably in coextrudate form.

The polyamides may be selected from the series of PA6, PA66, PA610, PA612, PA11 or PA12. Ionomer-resins are amorphous thermoplastics such as e.g. ethylene/acrylic acid/sodium acrylate copolymers or e.g. copolymers comprising ca. 89% ethylene and ca. 11/acrylic acid, half of which as sodium salt or zinc salt. Especially preferred are ionomer-resins carrying the Du Pont trade name "Surlyn".

The second functional layer may be deposited from an extrusion nozzle onto the first functional layer. The second functional layer may e.g. be a laminate comprising a film of polyamide and a film of ionomer-resin, or a polyamide film and a film of ethylene/vinylchloride copolymer. In particular, the second functional layer may be deposited on the free side of the paper. The free side of the paper is to be understood as the side without the coating.

In order to improve the bonding of the first and second functional layers, a corona, flame, plasma or ozone treatment may be carried out, usefully on the paper.

In keeping with the method of joining the first and second functional layers, bonding agents or laminating agents may be employed.

The first functional layer may exhibit a printed or counterproof image such as product information, pictures, texts etc. and may in particular exhibit a printed or counterproof image on the side facing the second functional layer. The printed or counterproof image may also be deposited on the second functional layer. One possibility is for the printed or counterproof image to be deposited on the outward facing side of the second functional layer. The printing method employed may be e.g. relief printing, intaglio printing, offset or flexo printing. Printed images deposited on the outside may be covered by a protective coating. The printed or counterproof images may cover the whole or only part of the surface area.

The second functional layer may be opaque, translucent or transparent and may be non-coloured or coloured.

The materials used for the second functional layer usefully exhibit the property—according to their moisture content, to alter the permeability of gases and water vapour, and in particular, with increasing moisture level to increase the permeability of gases and water vapour.

By means of the second functional layer the exchange of gas between the contents of a package made of the packaging material described above and the surrounding atmosphere is regulated. Should the contents of a package be a soft cheese, then as it matures this cheese forms $CO_2$ and $NH_3$, whereas a certain amount of $O_2$ should enter the cheese.

With the described packaging material, therefore, a controlled exchange of moisture and gases is achieved and with that the optimal maturing of soft cheeses.

Preferred in practice is a packaging material which—starting from the side facing the contents—features the following sequence of layers:

a) a first functional layer of
  a1) an extrusion coating, dispersion coating, paraffin coating, hot-melt coating or an organic coating layer,
  a2) a paper
b) a second functional layer of
  b1) an ionomer-resin or an ethylene-vinylalcohol copolymer and
  b2) a polyamide
where layer b2) lies on the outside of the packaging.

The present invention relates also to the use of the present packaging material for packaging soft cheeses for the maturing process.

The soft cheese is packaged, in particular immediately or shortly after manufacture, in the packaging material and matures in the packaging material. The soft cheese may be left in the packaging material until consumption by the end user.

DETAILED DESCRIPTION OF THE DRAWING

Figure 1:
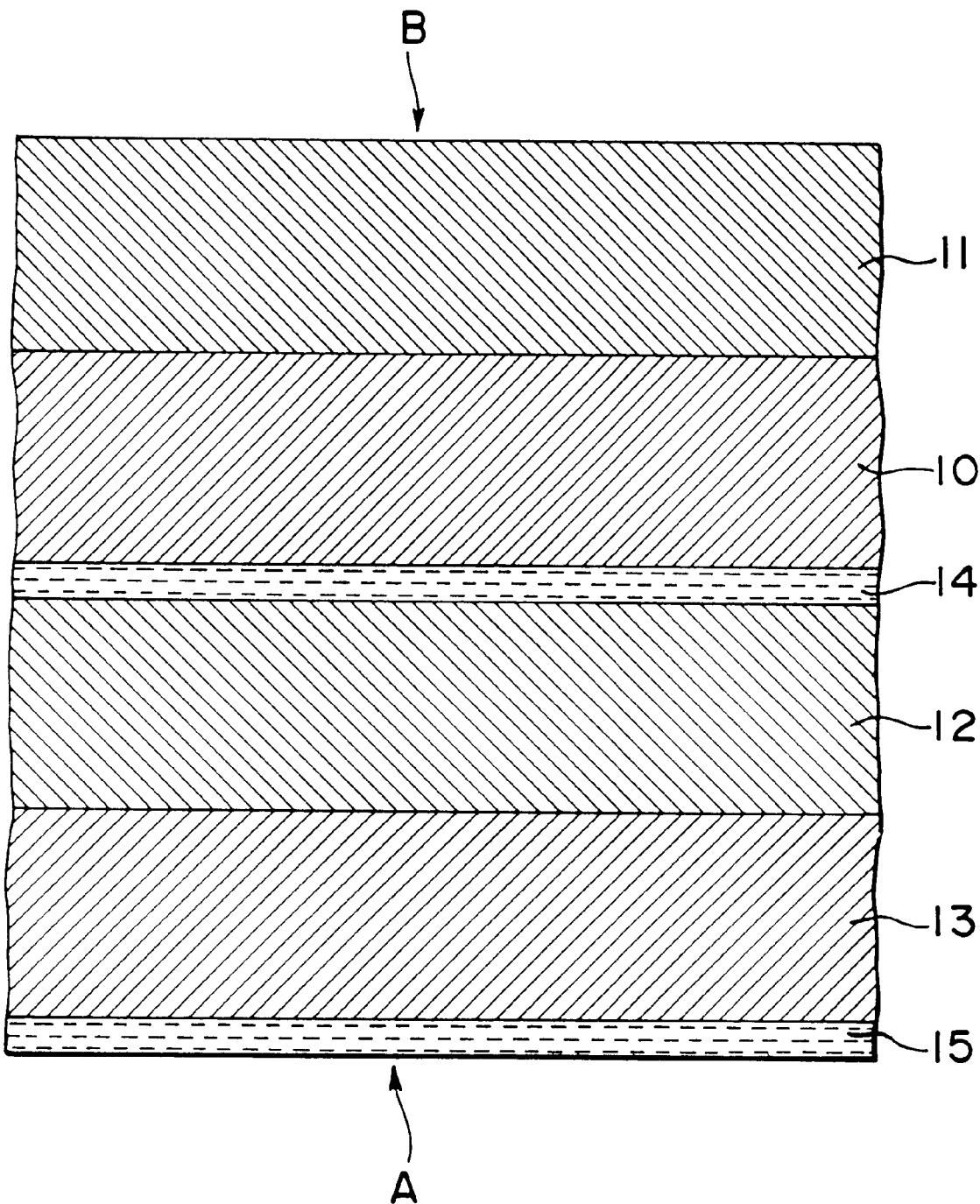
FIG. 1 is a cross-section through a packaging material according to the invention.

In, FIG. 1, the first functional layer 10, 11 is comprised of the paper 10 which has a weight per unit area of e.g. 10 to 100 g/m² and a coating 11 which may be an extrusion coating, a dispersion coating, paraffin coating, hot-melt coating or an organic coating layer, in each case with a weight per unit area of e.g. 1 to 20 g/m². The second functional layer 12, 13 is comprised of an ionomer-resin or ethylene-vinyl-alcohol copolymer layer 12 and a polyamide layer 13. Both layers may be deposited e.g. by coextrusion directly onto the still free side of the paper 10. It is also possible to produce a second functional layer 12, 13 from an ionomer-resin or an ethylene-vinyl-alcohol copolymer film 12 and a polyamide film 13. The ionomer-resin or an ethylene-vinyl-alcohol copolymer film 12 and/or if desired the polyamide film 13 may be e.g. printed on and/or bear a counterproof image. The printed or counterproof image is the visible on the outside A of a packaging. Instead of the counterproof image 14 or along with the counterproof image 14, a printed image 15 may be provided on the outward facing side A of the packaging material. The coating 11 lies on side B of the packaging material facing inwards i.e. side B faces the contents. The inward facing side B lies directly on the material to be packaged and enables e.g. the desired growth of mould on a soft cheese. The coating 11 may be sealable and may be closed off at overlapping or folded areas by sealing under the application of pressure and/or heat.

We claim:

1. Packaging material for packaging moisture-sensitive products, containing at least two functional layers, comprising:
   (a) a first functional layer (10, 11) which exhibits mechanical strength and absorbs, retains and releases moisture, and which is selected from the group consisting of a paper (10) and a paper (10) with coating (11), and
   (b) a second functional layer (12, 13) which lies on the first functional layer (10, 11) and exhibits permeability to gases, the said permeability varying as a function of the moisture, and which is selected from the group consisting of (i) a polyamide (13), (ii) a polyamide (13) and an isomer-resin (12) and (iii) a polyamide (13) and an ethylene/vinylalcohol copolymer (12),
and the first functional layer (10, 11) and the second functional layer (12, 13) being permanently joined to each other.

2. Packaging material according to claim 1, wherein the paper (10) exhibits a coating (11) and is a paper-plastic laminate which bears, at least on one side, an extrusion coating, a dispersion coating, paraffin coating, hot-melt coating, laminate layer or an organic coating layer.

3. Packaging material according to claim 2, wherein the plastic (11) in the paper-plastic laminate contains a polyolefin, an ethylene-copolymer, a polyamide, a polyester, a polyvinyl chloride, a polyvinyl acetate, a polyacryl-acid-ester, paraffin, paraffin-plastic mixtures, colophonium derivatives, hydrocarbon resins, waxes, polyethylenes, polypropylenes, or organic sealing compounds.

4. Packaging material according to claim 1, wherein the polyamide (139) and the ionomer-resin (12) or the polyamide (13) and the ethylene/vinylalcohol copolymer (129) are a coextrudate.

5. Packaging material according to claim 1, wherein the packaging material features on the first functional layer (10, 11) a printed or counterproof image and, in particular on the side that faces the second functional layer (12, 13), exhibits a printed or counterproof image and/or a printed image (15) or counterproof (14) is provided on the second functional layer (12, 13).

6. Packaging material according to claim 1 for wrapping soft cheeses for maturing.

7. Packaging material according to claim 1, wherein the packaging material, starting from the side facing the contents, has the following sequence of layers:

(a) a first functional layer (10, 11) of
  (a1) an extrusion coating, dispersion coating, paraffin coating, hot-melt coating or an organic coating layer (11),
  (a2) a paper (10)
(b) a second functional layer (12, 13) of
  (b1) an ionomer-resin (12) or an ethylene-vinylalcohol copolymer (12) and
  (b2) a polyamide (13), where layer (b2) lies on the outside of the packaging.

8. Packaging material according to claim 3, wherein the polyolefin is polyethylene or polypropylene, the paraffin-plastic mixture is a mixture of paraffin and ethylene-vinylacetate copolymers, and the organic sealing compound is polyvinyl-chloride, polyolefins or polyacrylesters.

\* \* \* \* \*